United States Patent
Ruof

[11] 3,937,526
[45] Feb. 10, 1976

[54] SINGLE VALVE BRAKING SYSTEM HAVING ANTI-SKID CONTROL

[75] Inventor: Edgar J. Ruof, Akron, Ohio

[73] Assignee: Goodyear Aerospace Corporation, Akron, Ohio

[22] Filed: Dec. 16, 1974

[21] Appl. No.: 533,248

[52] U.S. Cl. ............... 303/21 A; 244/111; 303/20
[51] Int. Cl.² .................................... B60T 8/00
[58] Field of Search ............... 188/181; 235/150.2; 244/111; 303/20, 21; 340/53

[56] References Cited
UNITED STATES PATENTS

| | | | |
|---|---|---|---|
| 3,382,012 | 5/1968 | Lucien | 303/21 P |
| 3,776,605 | 12/1973 | Ruof | 303/21 A |
| 3,836,208 | 9/1974 | Wienecke | 303/21 F |
| 3,847,445 | 11/1974 | Bissell et al. | 244/111 X |

FOREIGN PATENTS OR APPLICATIONS

| | | | |
|---|---|---|---|
| 1,961,039 | 6/1971 | Germany | 303/21 A |

Primary Examiner—Trygve M. Blix
Assistant Examiner—Stephen G. Kunin
Attorney, Agent, or Firm—F. W. Brunner; P. E. Milliken; E. W. Oldham

[57] ABSTRACT

An anti-skid and brake control system for use on an aircraft wherein the output signals from standard anti-skid circuitry are combined with the signals from a brake pedal transducer to create braking signals. The braking signals are applied to current controlled hydraulic valves for regulation of the application and release of brake pressure. The brakes utilized are dual cavity brakes with corresponding cavities of all brakes being interconnected to the same hydraulic line. Shut-off valves are interposed in the hydraulic lines and are operative to enable the brake valves to regulate brake pressure when either brake pedal of the aircraft has been depressed a fixed amount. Biasing circuitry is presented to affect the brake signal in such a manner as to overcome a dead band within the response characteristics of the brake valves utilized.

6 Claims, 4 Drawing Figures 3,937,526

SINGLE VALVE BRAKING SYSTEM HAVING ANTI-SKID CONTROL

BACKGROUND OF THE INVENTION

Presently there exist numerous types of anti-skid systems combined with brake control apparatus for achieving effective and reliable braking action on a moving vehicle. The aircraft industry requires such systems so as to achieve optimum braking action upon an aircraft during its braking procedure on the runway. Heretofore, such systems have been mechanical or hydraulic in nature requiring a mechanical or hydraulic linkage between the braking pedals and the metering valves. Being of hydraulic-mechanical nature, such systems have been bulky in construction, susceptible to failure of mechanical parts, and inherently messy due to hydraulic leakage. Further, presently available systems utilize two separate and distinct valves, one being the metering valve and the other an anti-skid valve to control braking. Such construction is inherently expensive due to the presence of two valves and further adds to the potentials for failure.

Consequently, it is an object of the invention to present an anti-skid system and brake control device whereby much of the trouble with mechanical linkage and hydraulic interconnections of presently utilized systems may be alleviated.

Still another object of the invention is to present an anit-skid system and brake control device wherein a single valve per brake may be utilized for both braking and anti-skid purposes.

Yet another object of the invention is to present an anti-skid system and brake control device wherein anti-skid signals and brake pedal signals may be combined and applied to a valve driver for exciting a single valve.

Still a further object of the invention is to present an anti-skid system and brake control device which is reliable in operation, relatively inexpensive to construct and maintain, and readily adaptable for implementation with state of the art elements.

These objects and other objects which will become apparent as the detailed description proceeds are achieved by an anti-skid system and brake control device for use on a vehicle having at least two wheels and having anti-skid circuitry connected to said wheels for providing anti-skid signals indicative of skidding activity and further having brake pedal transducers for producing pedal signals indicative of the degree of brake pedal depression, comprising: rectifiers connected to the transducers for producing a D. C. level from the associated pedal signals; differencing circuits connected to the rectifiers and anti-skid circuits and producing brake signals indicative of the difference between the pedal and anti-skid signals; brake valve means connected to each of said wheels; and valve driving means interconnected between said differencing circuit and said brake valve for regulating the application and release of brake pressure according to said brake signals.

For a complete understanding of the structure and techniques of the invention, reference should be had to the following detailed description and accompanying drawings wherein.

Figure 1:
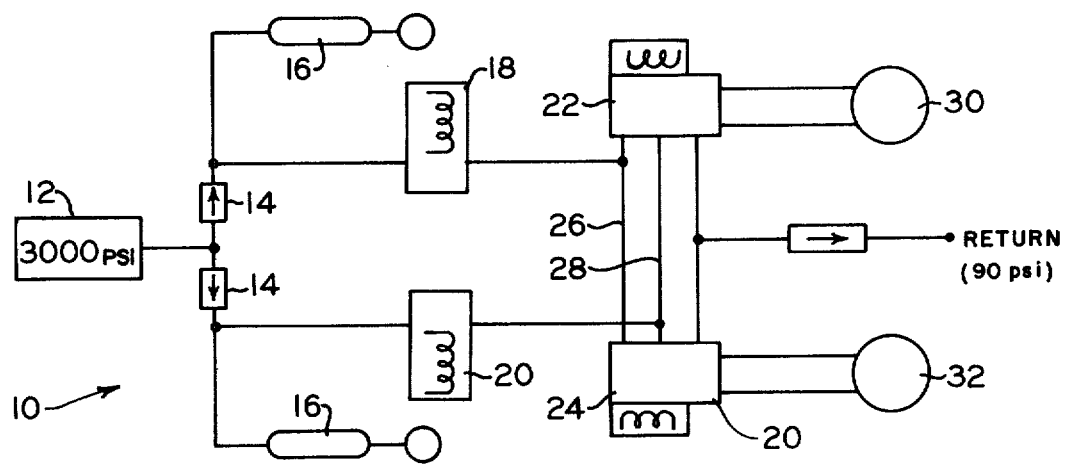
FIG. 1 is a block diagram of the hydraulic system of the invention.

Referring now to the drawings and more particularly FIG. 1 it can be seen that the hydraulic system of the invention is designated generally by the numeral 10. A pressure source 12 is adapted for passing hydraulic fluid under pressure through check valves 14 to pressure accumulators 16. The check valves 14 are, of course, interposed for purposes of inhibiting pressure leakage back through the line to the pressure source 12 in case of its failure. The accumulator 16 is provided for guaranteeing the presence of sufficient pressure within the hydraulic system to achieve safe braking action in the case of failure of the source 12. Interconnected between the check valves 14 and associated accumulators 16 are two way shut-off valves 18, 20 which are respectively connected to hydraulic lines 26, 28, both of which pass through brake valves 22, 24 and feed hydraulic brakes 30, 32. In the system shown, there are only provided two brakes, a left brake 30 and a right brake 32, indicating that a two wheeled vehicle is being discussed. Of course, the structure of the invention could be expanded to include braking systems for vehicles having any number of wheels.

As will be further elaborated upon hereinafter the shut-off valves 18, 20 are interconnected in such a way that they are actuated simultaneously. The brakes 30, 32 are of the dual cavity type such that one cavity of each is supplied via line 26 while the other cavity of each is supplied via line 28. Consequently, the failure of either of the valves 18, 20 or the portion of the system associated therewith, will only result in a dimunition of the braking efficiency of the brakes 30, 32 and will not result in a complete failure thereof. Thus, a particular safety feature of the invention is the provision for this redundancy within the hydraulic system.

As will yet further be elaborated upon, the actuation of the valves 18, 20 merely enables the brake valves 22, 24 by applying pressure thereto; such brake pressure being metered to the brakes 30, 32 under pilot control of the brake valves.

Figure 2:
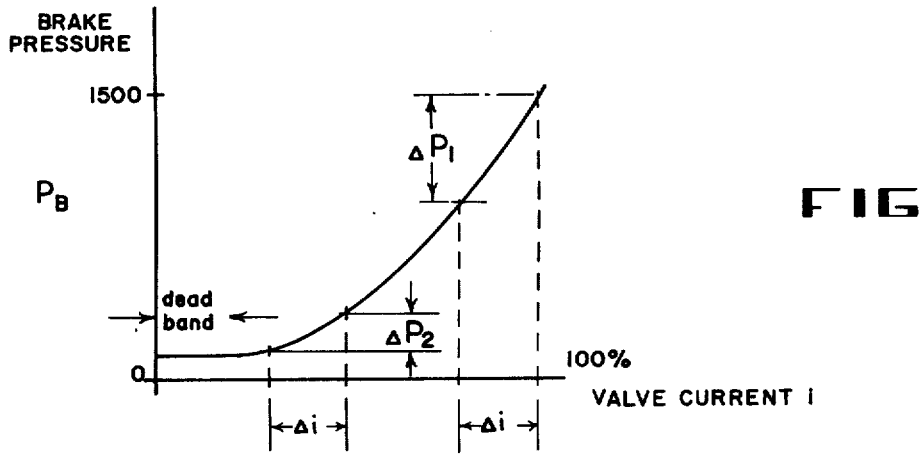
FIG. 2 is a graphical illustration of the response characteristics of the brake valve utilized in the system.

The response characteristics of the valves 22, 24 and their respective brakes 30, 32 is shown in FIG. 2. As can be seen, the response characteristics shown herein are of such nature that the brake pressure applied is directly related to the current applied to the valve. However, since the function is not linear, given increases in current do not result in directly proportional increases in brake pressure. This is clearly shown by the current increases $i$ taken at two points along the curve wherein different increases in pressure are realized; to wit, $\Delta P1$ and $\Delta P2$.

Figure 3:
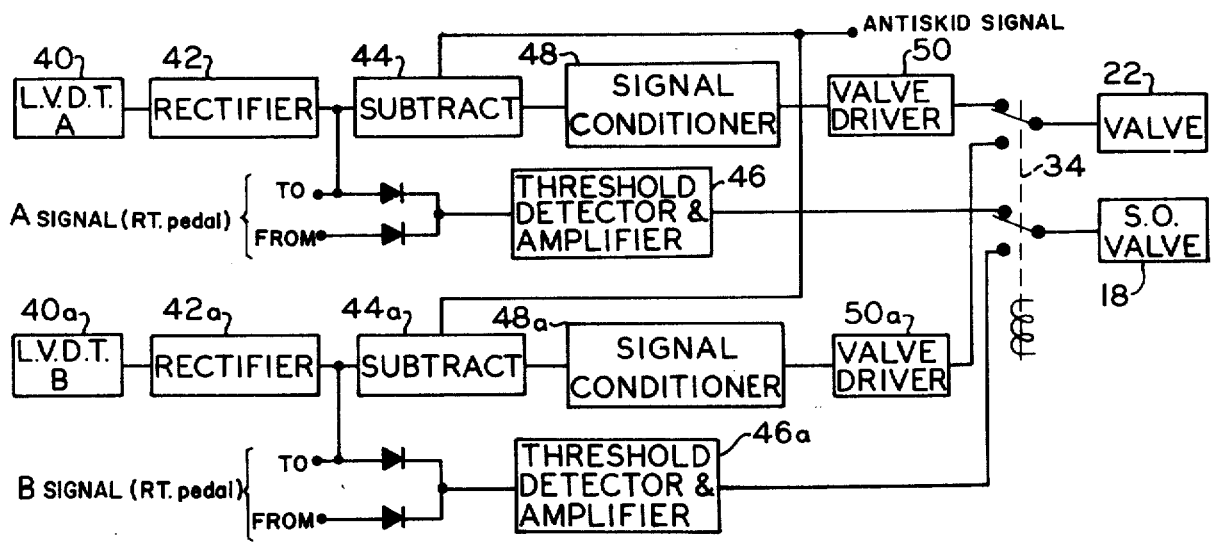
FIG. 3 is a schematic block diagram of a braking circuit according to the invention.

With an understanding of the hydraulic system of FIG. 1 and the brake control response characteristics of FIG. 2, reference should now be had to FIG. 3 wherein a schematic block diagram of the circuitry of the invention is shown. It should be appreciated that this Figure represents a diagram of only the left brake of the invention and that a similar system would be utilized for the right brake of the two wheeled vehicle under consideration. The brake pedals of the aircraft are connected to linear variable differential transformers, the left brake being connected to the LVDT 40. As is well known to those skilled in the art, the output of the LVDT 40 is an AC voltage which is of an amplitude linearly proportional to the force applied to the brake pedal, or the pedal movement. At a zero force application, there is no output from the LVDT 40 since the secondaries thereof are standardly connected in a phase-opposition relationship. The output of the LVDT 40 is passed to a rectifier and filter circuit 42 where a DC voltage having a slight ripple associated therewith is created having a DC amplitude directly proportional to that of the output of the LVDT and consequently being linearly proportional to the force applied to the left brake pedal. The DC output from the rectifier 42 is then applied to a differencing or subtract circuit 44 wherein it is combined with anti-skid signal from a standard anti-skid circuit. Consequently, the subtract or differencing circuit 44 modifies the braking signal in accordance with the skidding activity of the wheel as monitored by anti-skid circuitry. Of course, during normal operation and taxiing maneuvers, there would be no anti-skid signal present and the output of the element 44 would be that received from the rectifier 42.

The output of the differencing circuit 44 is then applied to a signal conditioner 48 wherein the signal is shaped for eventual application to the brake valve. However, if the response characteristics of the brake are as those shown in FIG. 2, the element 48 may be dispensed with and the output of the circuit 44 be applied directly to a current valve driver 50. It is only necessary to include the structure of the element 48 if the pressure-current response characteristic of the valve is not as shown in FIG. 2. If such is not the case, the provision of a signal conditioning circuit is well within the scope of one skilled in the art to implement.

Since the functioning of the brake valve of an aircraft must most generally be temperature insensitive, it is most preferable that the brake valve of this system be current rather than voltage dependent. Consequently, the valve driver 50 is presented to receive the signal from the circuit 44 (or the circuit 48 if necessary) to convert the voltage signal to a current drive signal for eventual application to the valve 22.

Also receiving the output of the rectifier 42 is a threshold detect and amplifier circuit 46. As will be further discussed hereinafter this circuit is adjusted such that an output is emitted therefrom when the output of the rectifier 42 indicates that the associated brake pedal has been depressed an amount equivalent to a nominal percentage of full pedal travel. In the instant invention, this value has been selected at 6 percent. When the pilot has depressed the pedal 6 percent of the full pedal travel, the output of the rectifier 42 is sufficient to cause an output from the threshold detect and amplifier 46 so as to trigger the shut-off valve 18. A circuit similar to that shown in FIG. 3 is provided for the right brake also and it can been seen that the output of the rectifier 42 is similarly applied to a threshold detect and amplifier circuit associated with the right brake. Similarly, as is shown in FIG. 3, the threshold detect and amplifier 46 receives a signal from the rectifier associated with the right brake. Consequently, both shut-off valves 18, 20 as shown in FIG. 1 are open when either of the brake pedals is depressed an amount equivalent to 6 percent of maximum brake pedal travel. With the valves 18, 20 so actuated the brake valves 22, 24 are enabled for appropriate braking activity.

As should further be noted from FIG. 3, there is a redundancy of circuitry provided with each of the left and the right brakes. The elements 40a–50a correspond identically in function with the elements 40–50 discussed directly hereinabove. Indeed, the left brake pedal has associated therewith two LVDT's (40, 40a) each of which emits a signal proportional to brake pedal travel. The circuit 40a–50a operates identically as the circuit 40–50 just discussed. A switch 34 is operatively selectable by the pilot for enabling either of the circuits 40–50 or 40a–50a to control the braking activity of the vehicle. If the pilot finds that one of the circuits appears to be malfunctioning, he may, via switch 34, select the redundant circuit for his braking efforts. This structure provides further safety redundancy within the system.

Figure 4:
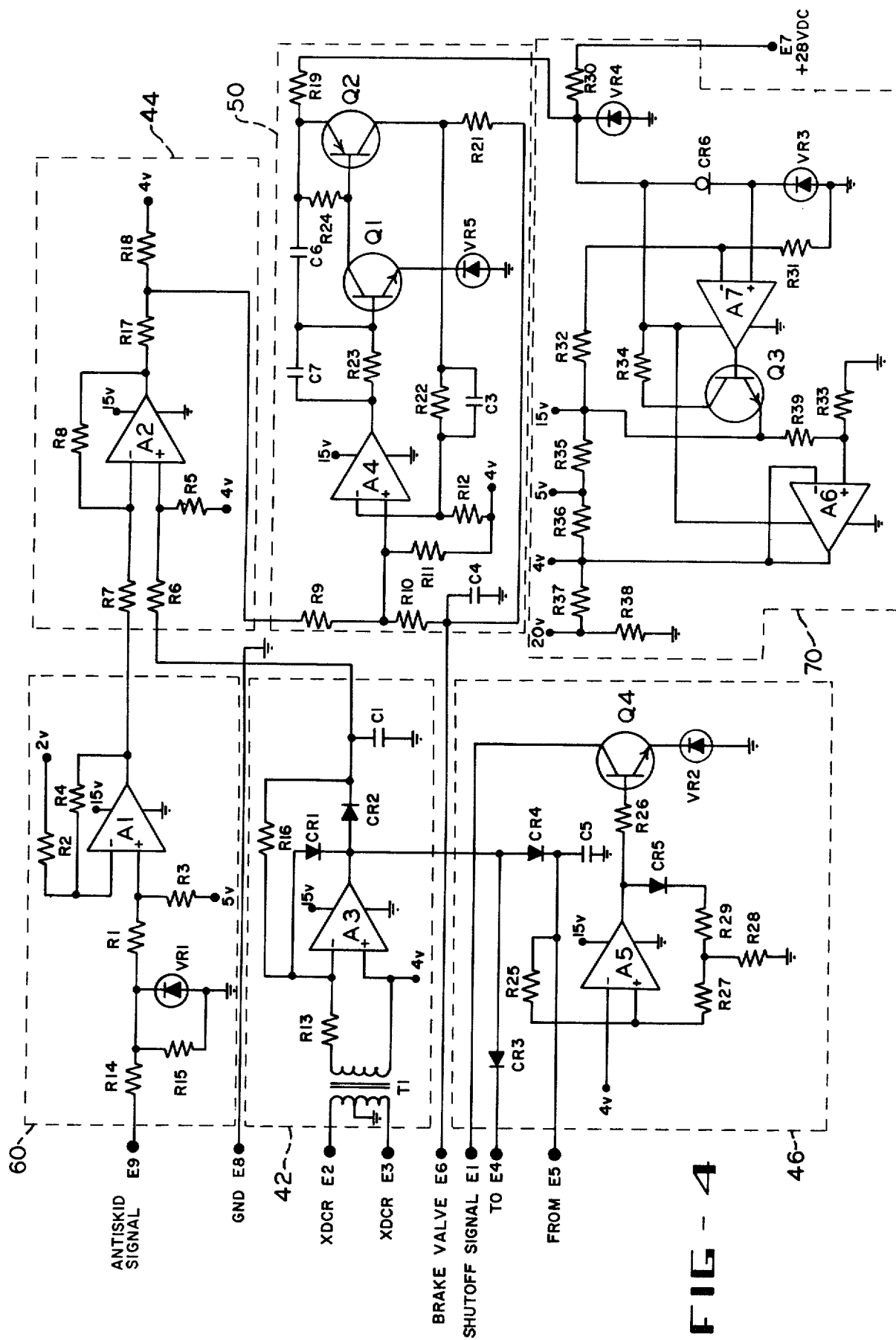
FIG. 4 is a detailed schematic of the circuitry of FIG. 3.

Referring now to FIG. 4, an appreciation of the preferred electronic structure of the invention may be had. The level shift circuit 60, not shown in FIG. 3, is utilized on those aircraft wherein a negative voltage source is not available. Specifically, for the embodiment under consideration, the aircraft is assumed to have only a 28 volt DC supply available therein and hence a level shift is necessary to cause the signal to be referenced to a positive voltage rather than ground with the reference then being compensated for at the output of the system since the brake valves are designed to operate with respect to a ground reference. The specific characteristics of the level shift 60 will be brought out hereinafter but suffice it to say that the anti-skid signal from an appropriate anti-skid device is applied to the subtract circuit 44 after its reference is appropriately shifted.

The rectifier 42 has a 1:1 isolation transformer at the input end thereof which is connected to the brake pedal LVDT or transducer. The transformer T1 is utilized in the normal manner for isolating the input signal from noise that might otherwise be coupled into the input signal thus distorting the same. The secondary of the transformer T1 is connected to a precision rectifier circuit which includes the amplifier A3. Such rectifiers are operative to receive and rectify low voltage input signals such as those produced by the pedal LVDT's at low pedal force. The diode CR1 is interconnected between the negative input and the output of the amplifier A3 to clamp the positive half cycle of the input thereto such that the precision rectifier 42 operates only upon the negative half of the input cycle as a half wave precision rectifier. The capacitor C1 is interposed for purposes of filtering the output DC level and is chosen with due consideration given to a trade-off between ripple factor and pedal response time. Of course, the output frequency of the brake pedal transducer or LVDT is of such nature as to cause the response time considerations to be of minor concern.

The output from the rectifier 42 and the anti-skid signal are combined in the subtract circuit 44. This circuit again is of a generally standard nature utilizing a differencing amplifier A2 producing an output therefrom representative of the difference between the anti-skid signal and the brake pedal position signal. The voltage divider comprising resistors R17 and R18 is utilized for purposes of scaling the output of the amplifier A2 for application to the valve driver 50. Of course, if there is no anti-skid signal, the output of the subtract circuit 44 is representative solely of the output of the rectifier 42.

The output of the subtract circuit 44 is applied through the amplifier A4 to the base of the transistor Q1. The emitter of the transistor Q1 is connected to ground through the zener diode VR5. The presence of this zener diode inhibits conduction gating of the transistor Q1 until the input to the base thereof exceeds the zener voltage combined with the emitter drop. The amplifier A4 is connected with a feedback through the resistor R22 to operate in the linear mode. An output signal from the subtract circuit 44 is amplified by the amplifier A4 to turn on the transistor Q1 which in turn turns on the transistor Q2 to pass the valve driving current through the resistor R21. The current from the valve driver 50 is, by virtue of the linear mode operation of the amplifier A4 and the utilization of the transistors Q1 and Q2 for driving the valve via resistor R21, insensitive to temperature changes and variations. The capacitors C3, C4, C6 and C7 are provided within the valve driver circuit to prevent instability therein due to the inductance of the valve being driven.

The threshold detect and amplifier circuit 46 receives the output of the amplifier A3 of the rectifier circuit 42. This signal is applied through diode CR3 to a similar circuit for the right brake control elements and similarly, a signal is received from such right brake circuitry and applied to the input of the amplifier A5 through the resistor R25. The output of the amplifier A3 of the rectifier 42 is applied through the diode CR4 to this same point. Consequently, the input to the amplifier A5 and the voltage level of the capacitor C5 is equivalent to the higher voltage level of the output of the rectifiers 42 of the right and left brake circuits. Thus the amplifier A5 of the threshold detect and amplifier circuit 46 receives at the positive input thereof a voltage level indicative of a greater degree of depression of the two brake pedals of the aircraft. With resistors R25 and R27 appropriately selected to provide a voltage divider, the amplifier A5 may be caused to turn on when the voltage at the positive input thereof is at a preselected level. In the instant invention this level is calibrated, with respect to the biasing of the negative input of the amplifier A5, to turn the amplifier A5 on when either of the brake pedals is depressed 6 percent of maximum pedal depression. The diode CR5 and resistor R29 provide a hysteresis latch effect for operation of the amplifier A5 for purposes of alleviating instability. With the amplifier A5 on, the transistor Q4 is gated on to open one of the two-way shut-off valves 18 or 20 of the system. The other is turned on via CR3 and the threshold detect and amplifier section of the circuit for the right brake. With these shut-off valves open, the hydraulic system of the invention is operative to receive braking control via the pilot's application and release of pedal pressure and the resultant control of the brake valves 22, 24. Again, the zener diode VR2 connects the emitter of the transistor Q4 to ground in order to inhibit the gating of the transistor Q4 until the amplifier A5 has been turned on. Such function is similar to that of the zener diode VR5 as discussed hereinabove.

The power supply circuit 70 of the invention is provided to operate from a 28 volt DC supply voltage which is assumed to provide power for the aircraft utilizing the invention. Of course, value changes within the structure of the circuitry 70 could be made to cause the same to operate from any of numerous voltage sources. As can be seen, the aircraft supply voltage is connected to the power supply 70 through a resistor R30 and zener diode VR4. These elements are presented to prevent the voltage from exceeding a preselected level: in other words, noise peaks are clipped thereby. The 28 volt supply feeds through a constant current diode CR6 and a 10 volt zener diode VR3 to ground. There is thus supplied to the positive input of the operational amplifier A7 a steady 10 volt level. The output of this amplifier drives the transistor Q3 into conduction; the collector of the transistor Q3 being supplied by the 28 volt source. The emitter of transistor Q3 is fed back via R32 to the negative input of the amplifier A7 and thus stabilization is achieved when the junction between the voltage divider resistors R32, R31 is at 10 volts. This is achieved when the emitter of the transistor Q3 is at a 15 volt level as shown.

The 15 volt power supply is then applied to the positive input of the amplifier A6 through the voltage divider comprising R39, R33. There is thus applied to the positive input a 4 volt level and, since the amplifier A6 has the output thereof fed back to the negative input, stabilization occurs when the output of the amplifier is at a steady 4 volts. Resistors R35, R36, R37 and R38 are then selected for appropriate interconnection between the 15 volt and 4 volt supplies and ground to achieve 5 volt and 2 volt reference points. Since the 4 volt and 15 volt supplies are relatively stable by virtue of their mode of generation, the 2 volt and 5 volt supplies are similarly stable and sufficient for purposes of desired use. The voltages created within the power supply circuit 70 are used for biasing of the various amplifiers of the system and for providing an appropriate offset (4 volts) for the signals generated.

As mentioned hereinabove the level shift circuit 60 is provided since the anti-skid signal available from the anti-skid circuit operates about a ground reference.

Further, operational amplifiers A1, A2, A3, A4, and A5 must not give distorted output signals, yet they must operate from a single power source, which is 28 VDC. It is therefore necessary to utilize a scheme whereby all signals within the circuit are referenced to a DC level that is a few volts above ground potential. Four volts are used in this preferred circuit such that zero signal from any amplifier is 4 VDC. The anti-skid signal however is zero VDC for zero signal as it is received at the input terminal of the circuit of FIG. 4. Hence, the level shift circuit is necessary so that the anti-skid signal can be superimposed on 4 VDC to give, for example, 7 volts at the output of A1 when an anti-skid signal of 3 volts is across R15. In addition to shifting the level of the anti-skid signal the level shift circuit is biased by 2 volts on R2 and by 5 volts on R3 so as to have 3 volts rather than 4 volts on the output of A1 when the anti-skid signal is zero. This provides a quiescent valve current that is sufficient to overcome the dead band of the valve as shown in FIG. 2, so that the brake operation starts at the end of the dead band rather than at zero current.

The voltage divider of R14, R15 and the zener diode VR1 are provided to scale and limit the amplitude of of the anti-skid signal as the same is applied to the input of the amplifier A1. If a full brake release signal is received from the anti-skid system, the circuitry as shown is operative to limit the amplitude of this signal so as not to exceed the limit of the signals operative with the remaining circuitry of the system. In other words, R14 and R15 of the circuitry of the positive input of the amplifier A1 are set so as to scale the anti-skid signal whereas VR1 is to limit a full dump anti-skid signal.

Thus it can be seen that the objects of the invention have been achieved by the structure presented hereinabove. A system utilizing a single brake valve for each wheel may receive braking signals from both anti-skid circuitry and the brake pedals to achieve optimum braking action. While in accordance with the Patents Statutes only the best mode and preferred embodiment of the invention has been presented and described in detail, it is to be understood that the invention is not limited thereto or thereby. Consequently, for an appreciation of the scope and breadth of the invention reference should be had to the following claims.

The embodiments of the invention in which an exclusive property or privilege is claimed are defined as follows:

1. An anti-skid system and brake control device for use on a vehicle having at least two wheels and having anti-skid circuitry connected to brakes on each of said wheels for producing anti-skid signals indicative of skidding activity and further having brake pedals connected to brake pedal transducers for producing pedal force signals indicative of the degree of brake pedal depression, comprising:
   rectifiers connected to the transducers for producing a DC signal from the associated pedal signals;
   differencing circuits connected to the rectifiers and anti-skid circuits for producing brake signals indicative of the difference between the pedal force and anti-skid signals;
   current controlled brake valve means connected to brakes on each of said wheels;
   valve driver circuit means interconnected between said differencing circuit and said brake valve means for regulating the application and release of brake pressure according to said brake signals; and
   wherein said brakes are dual cavity brakes, having first and second cavities, and a first hydraulic line interconnecting the first cavity of all brakes with a hydraulic pressure source, and a second hydraulic line interconnecting the second cavity of all brakes with said hydraulic pressure source, each hydraulic line having a shut-off valve positioned between said hydraulic pressure source and the respective cavities, and further including threshold detection circuit means interconnected between said rectifiers and the shut-off valves for effecting the application of hydraulic pressure to the brake cavities when either of the brake pedals is depressed beyond a particular amount.

2. The anti-skid system and brake control device as recited in claim 1 wherein each said rectifiers is a precision rectifier comprising an isolation transformer receiving a pedal force signal and driving a half-wave rectifier.

3. The anti-skid system and brake control device as recited in claim 1 wherein said brakes have a dead band in which increases of current to the valve means results in no increase of brake pressure and wherein said differencing circuit includes biasing means to present a quiescent output to the valve driving circuit means to overcome said dead band.

4. A brake control system for use on an aircraft having at least two wheels, one on each side of the aircraft, each wheel having an electrically controlled hydraulic valve connected to a brake for such wheel, all wheels on the same side of the aircraft being controllable by the same brake pedal and each wheel having anti-skid circuitry associated therewith to produce anti-skid signals indicative of skidding activity of the wheel comprising:
   a brake pedal transducer connected to each pedal and producing a pedal signal corresponding to the degree of depression of said pedal;
   first circuit means, including a differencing circuit, connected to said brake pedal transducers for receiving said pedal and anti-skid signals and producing a brake signal as a function thereof;
   valve driver means connected to said first circuit means and to said hydraulic valves for controlling application and release of brake pressure to the brakes;
   second circuit means connected to said transducers for opening shut-off valves in hydraulic lines between hydraulic pressure sources and the hydraulic valves to enable such hydraulic valves to regulate brake pressure when either brake pedal has been depressed a fixed amount; and
   wherein a level shift circuit is provided for biasing the differencing circuit to superimpose the anti-skid signal on a DC level before the application thereof to the differencing circuit.

5. The brake control system as recited in claim 4 wherein said first circuit means comprises a precision rectifier and a differencing circuit, the rectifier receiving the pedal signals and creating a corresponding DC signal and the differencing circuit creating said brake signal as a function of the difference between the pedal and anti-skid signal levels.

6. The brake control system as recited in claim 4 when said first circuit means further includes a precision rectifier receiving the pedal signals and creating a corresponding DC signal.

* * * * *